US012603668B1

(12) United States Patent
Reja et al.

(10) Patent No.: US 12,603,668 B1
(45) Date of Patent: Apr. 14, 2026

(54) QUADRATURE CIRCUIT FOR A RADIO FREQUENCY TRANSCEIVER

(71) Applicant: Dialog Semiconductor B.V., s-Hertogenbosch (NL)

(72) Inventors: Mahbub Reja, Chandler, AZ (US); Shobak Kythakyapuzha, Maricopa County, AZ (US); Zhi Mou, Chandler, AZ (US)

(73) Assignee: Dialog Semiconductor B.V., 's-Hertogenbosch (NL)

( * ) Notice: Subject to any disclaimer, the term of this patent is extended or adjusted under 35 U.S.C. 154(b) by 707 days.

(21) Appl. No.: 17/710,198

(22) Filed: Mar. 31, 2022

(51) Int. Cl.
 *H04B 1/00* (2006.01)
 *H04B 1/16* (2006.01)

(52) U.S. Cl.
 CPC ...................................... *H04B 1/16* (2013.01)

(58) Field of Classification Search
 CPC .. H04B 1/16; H04B 1/005; H04B 2200/0078; H04B 2201/70716; H03C 2200/0058; H03C 2200/00829; H03C 3/007; H03C 7/165; H03M 1/303; H03D 1/2245; G01B 9/02081
 See application file for complete search history.

(56) References Cited

U.S. PATENT DOCUMENTS

| 8,829,966 B2 * | 9/2014 | Chang ..................... H03B 19/14 327/201 |
| 10,581,415 B2 * | 3/2020 | Chakraborty ........ H04B 7/0452 |

| 2006/0104386 | A1* | 5/2006 | Leon .................... H04L 27/0014 375/332 |
| 2007/0211837 | A1* | 9/2007 | Zipper ..................... H04B 1/28 375/350 |
| 2010/0265875 | A1* | 10/2010 | Zhao ..................... H04B 1/0007 370/316 |
| 2013/0265892 | A1* | 10/2013 | Fernando ............. H04B 1/1027 370/252 |
| 2015/0063509 | A1* | 3/2015 | Hedayati .................. H04B 1/26 375/350 |
| 2015/0214926 | A1* | 7/2015 | Tohidian ................ H03H 11/04 333/173 |
| 2016/0329921 | A1* | 11/2016 | Jussila ................... H04B 1/123 |

OTHER PUBLICATIONS

"A 0.6V 32.5mW Highly Integrated Receiver for 2.4GHz ISM-Band Applications," by Ajay Balankutty et al., ISSCC 2008 / Session 20 / WLAN/WPAN / 20.6, 2008 IEEE International Solid-State Circuits Conference, Feb. 1, 2008, 3 pages.

(Continued)

*Primary Examiner* — Angelica Perez
(74) *Attorney, Agent, or Firm* — Salle Ackerman LLC; Stephen B. Ackerman

(57) ABSTRACT

The present document describes a quadrature circuit for a radio frequency receiver. The quadrature circuit comprises a first sub-circuit configured to generate a first baseband, BB, signal at an intermediate frequency, IF frequency, from a radio frequency, RF, signal using a local oscillator, LO, signal at a first phase. Furthermore, the quadrature circuit comprises a second sub-circuit configured to generate a second BB signal at the IF frequency from the RF signal using the LO signal at a second phase. The first and second sub-circuit each comprise an oscillator which is locked to the IF frequency.

20 Claims, 5 Drawing Sheets

(56) References Cited

OTHER PUBLICATIONS

"A 1.9nJ/b 2.4GHz Multistandard (Bluetooth Low Energy/Zigbee/ IEEE802.15.6) Transceiver for Personal/Body-Area Networks," by Yao-Hong Liu et al., ISSCC 2013 / Session 25 / Energy-Efficient Wireless / 25.4, 2013 IEEE International Solid-State Circuits Conference Digest of Technical Papers, Feb. 17-21, 2013, 3 pages.

"A 2.4-GHz Low-IF Receiver for Wideband WLAN in 0.6-μm CMOS—Architecture and Front-End," by Farbod Behbahani et al., IEEE Journal of Solid-State circuits, vol. 35, No. 12, Dec. 2000, pp. 1908-1916.

"A 2.4-GHz Low-Power Low-IF Receiver and Direct-Conversion Transmitter in 0.18-μm CMOS for IEEE 802. 15.4 WPAN Applications," by Iiku Nam et al., IEEE Transactions on Microwave Theory and Techniques, vol. 55, No. 4, Apr. 2007, pp. 682-689.

"A 3.6mW @ 1.2V High Linear 8th-order CMOS Complex Filter for IEEE 802.15.4 Standard," by Alberto Villegas et al., 2011 Proceedings of the ESSCIRC (ESSCIRC), Sep. 12-16, 2011, 5 pages.

"A 5-GHz direct-conversion CMOS transceiver," by Pengfei Zhang et al., IEEE Journal of Solid-State Circuits ( vol. 38, Issue: 12, Dec. 2003), pp. 2232-2238.

"Chameleon: A Dual-Mode 802.11b/Bluetooth Receiver System Design," by Ahmed A. Emira et al., IEEE Transactions on Circuits and Systems—I: Regular Papers, vol. 53, No. 5, May 2006, pp. 992-1003.

"Transceiver Architecture Selection: Review, State-of-the-Art Survey and Case Study," by Pui-In Mak et al., IEEE Circuits and Systems Magazine, Feb. 2007, pp. 6-25.

* cited by examiner

QUADRATURE CIRCUIT FOR A RADIO FREQUENCY TRANSCEIVER

TECHNICAL FIELD

The present document relates to a radio frequency transceiver, in particular for Bluetooth or WLAN communication.

BACKGROUND

A wireless receiver, such as a super-heterodyne receiver is configured to convert an incoming RF signal into an intermediate-frequency (IF) signal using multiple frequency conversions (i.e., multiple mixers), which lead to relatively high design and functional complexity. Furthermore, due to the image-frequency problem, relatively bulky off-chip (external) image-rejection (IR) filters may need to be used, thereby leading to a relatively low degree of integration on the chip and to increased cost.

SUMMARY

The present document is directed at the technical problem of providing a cost efficient and compact radio frequency receiver.

According to an aspect, a quadrature circuit for a radio frequency receiver is described. The quadrature circuit comprises a first sub-circuit configured to generate a first baseband (BB) signal at an intermediate (IF) frequency, from a radio frequency (RF) signal using a local oscillator (LO) signal at a first phase (e.g., at) 0°. Furthermore, the quadrature circuit comprises a second sub-circuit configured to generate a second BB signal at the IF frequency from the RF signal using the LO signal at a second phase (e.g., at) 90°. The first and second sub-circuit each comprise an oscillator which is locked to the IF frequency. In particular, a single circuit is described which performs the multiple functions of RF amplification, frequency conversion and BB amplification and/or filtering along with a combined quadrature function.

According to a further aspect, an RF receiver comprising the quadrature circuit as described in the present document is described.

According to a further aspect a method for processing a radio frequency (RF) signal. The method comprises generating a first BB signal at an IF frequency, from the RF signal using a LO signal at a first phase and using a first oscillator which is locked to the IF frequency. Furthermore, the method comprises generating a second BB signal at the IF frequency from the RF signal using the LO signal at a second phase (which is shifted by 90° with respect to the first phase) and using a second oscillator which is locked to the IF frequency.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner

BRIEF DESCRIPTION OF THE DRAWINGS

The invention is explained below in an exemplary manner with reference to the accompanying drawings, wherein.

DETAILED DESCRIPTION

Figure 1:
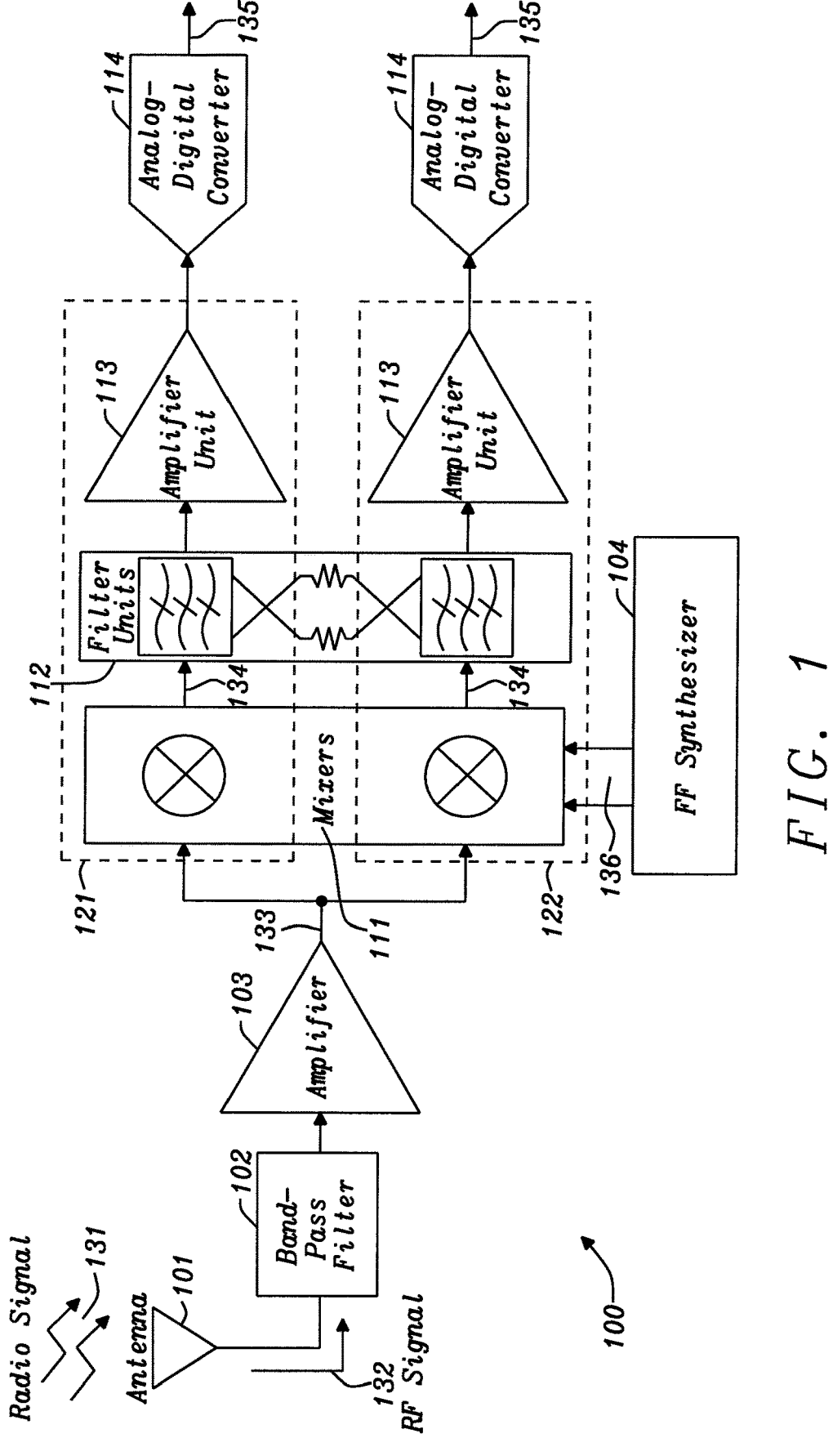
FIG. 1 shows an example radio frequency receiver.

As indicated above, the present document is directed at providing a compact and efficient radio frequency receiver. In this context, FIG. 1 shows a block diagram of an example low-intermediate frequency (LIF) receiver, as an example of a radio frequency receiver 100. In the LIF receiver 100, an incoming RF signal 132 (derived from a corresponding radio signal 131 using an antenna 101) is down-converted to a low IF signal 134, wherein the intermediate frequency may have a one or two-channel offset with regards to a DC (direct current) signal.

The receiver 100 may comprise a band-pass filter 102 configured to filter the radio frequency signal 132 and/or an amplifier 103, in particular a low noise amplifier (LNA), for amplifying the (filtered) radio frequency signal 132, thereby providing a processed radio frequency (RF) signal 133 for down-conversion into the IF, in particular into the LIF, domain.

Using an RF synthesizer 104 a local oscillator (LO) frequency 136 may be generated. The LO frequency 136 may correspond to the radio frequency of the RF signal 132, 133 minus or plus the intermediate frequency of the IF signal 134. Using mixers 111, the RF signal 133 may be mixed with the Cosine-Signal at the LO frequency 136 to provide the I-channel of the IF signal 134 (in the I-channel branch 121), and may be mixed with the Sine-Signal at the LO frequency 136 to provide the Q-channel of the IF signal 134 (in the Q-channel branch 122). The IF signals 134 (in the respective branches 121, 122) may be filtered in filter units 112 (e.g., using a low pass filter and/or a (complex) band-pass filter). Furthermore, the IF signals 134 may be amplified in the amplifier units 113 (e.g., using a programmable or variable gain amplifier). The (filtered and/or amplified) IF signals 134 (in the I-channel branch 121 and in the Q-channel branch 122) may be converted into the digital domain using respective analog-digital converters 114, thereby providing digital BB signals 135.

Figure 2:
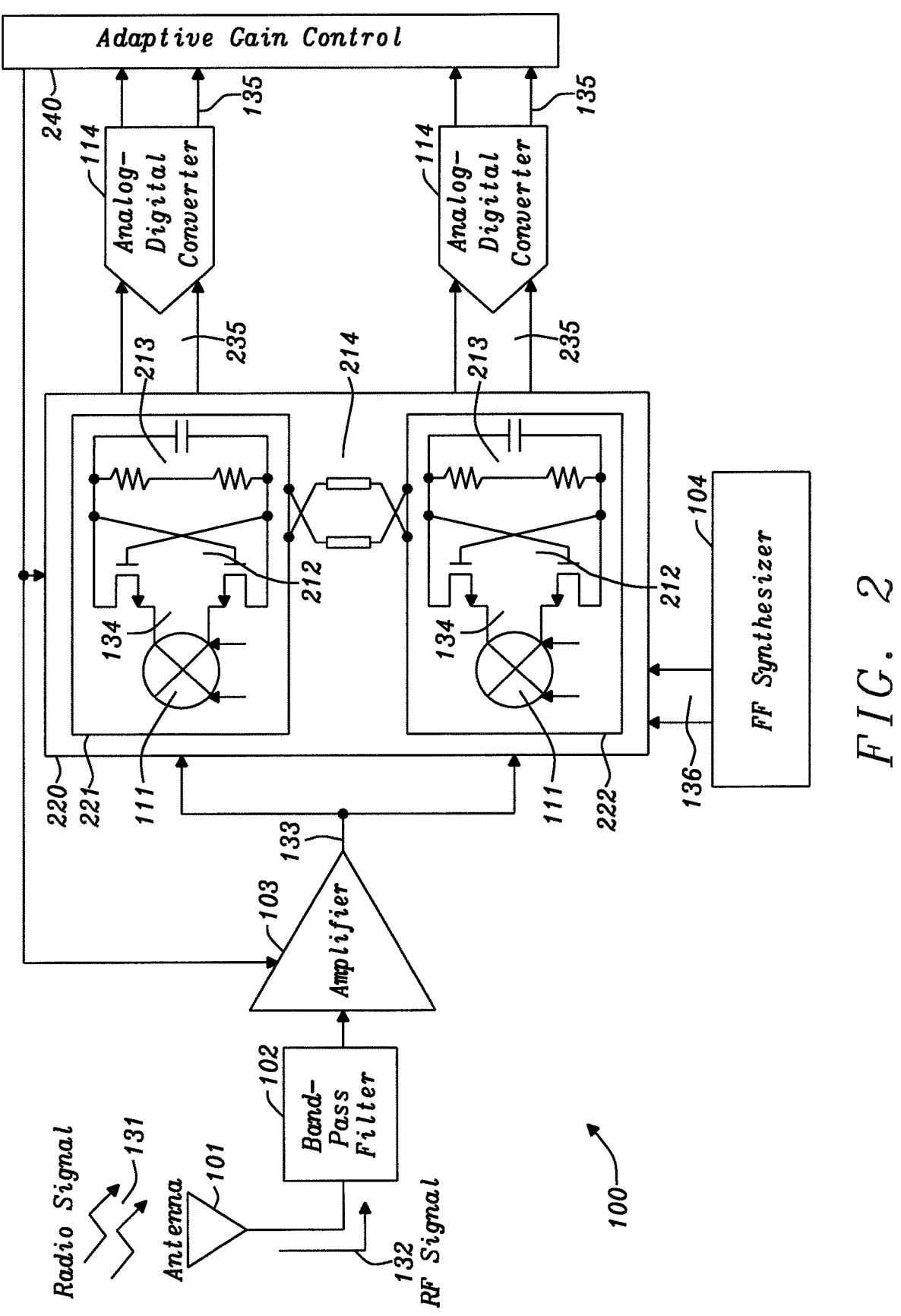
FIG. 2 shows an example radio frequency receiver comprising an oscillation circuit.
Figure 3A:
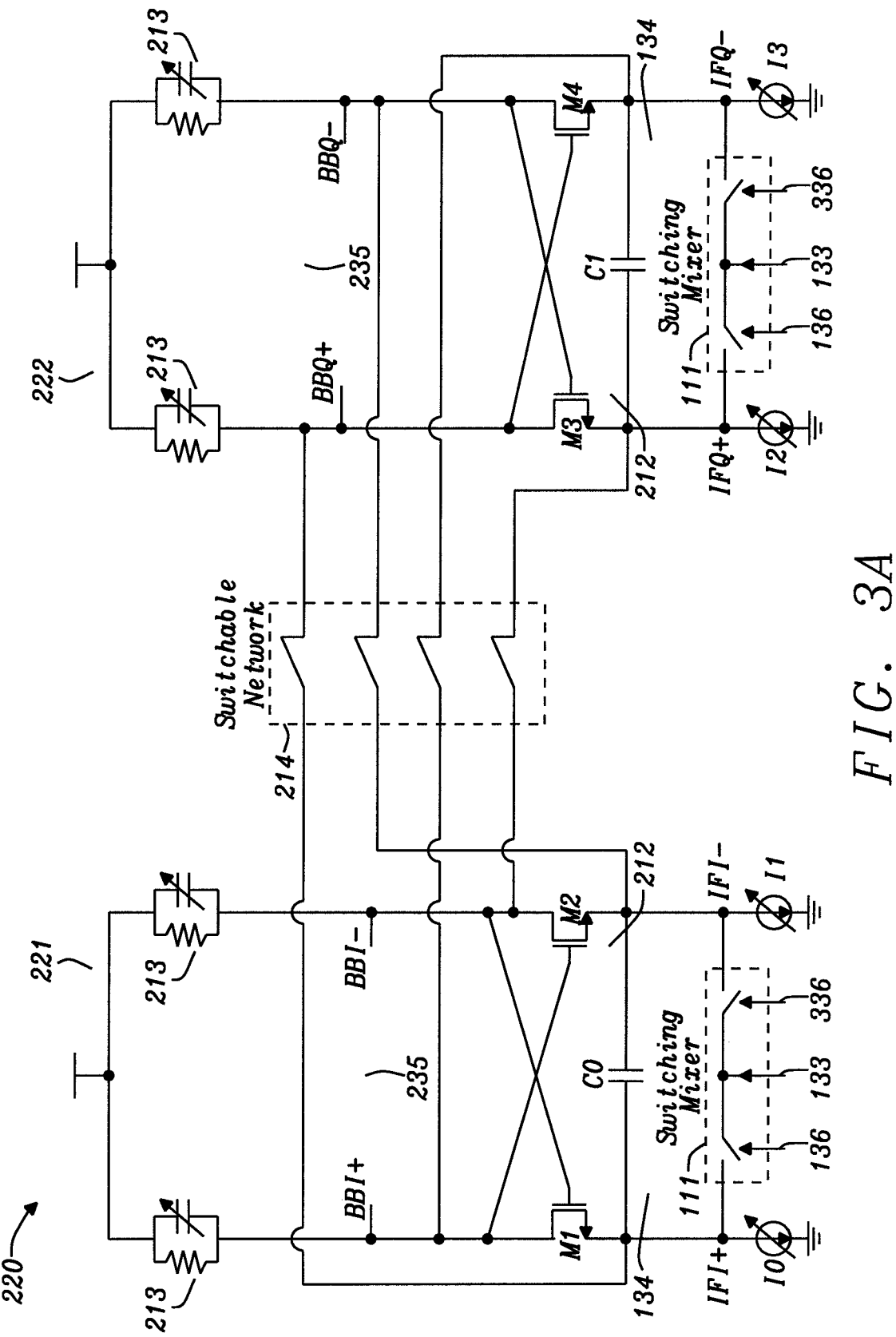
FIGS. 3A and 3B show circuit diagrams of example radio frequency receivers.
Figure 3B:
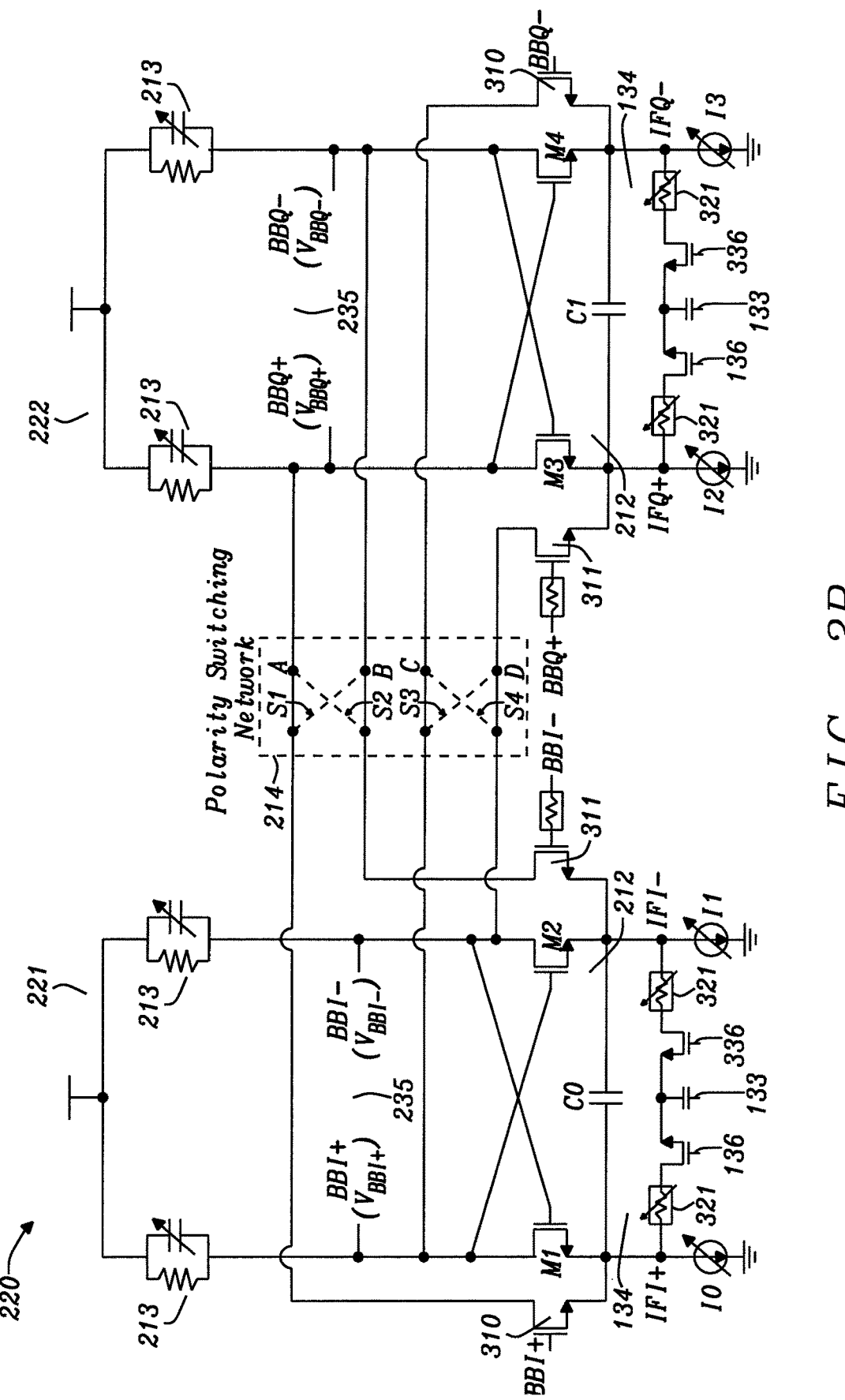

As indicated above, the present document is directed at providing a particular cost and energy efficient and compact wireless receiver, notably for BT (Bluetooth), BLE (Bluetooth Low Energie), WLAN (Wireless Local Area Network), etc. applications. This may be achieved by using a single-stage and combined-quadrature (I & Q) RF-IF-BB circuit which performs multiple functions, including frequency-conversion (RF to IF), amplification and filtering (to the desired passband). A wireless receiver 100 which comprises a combined quadrature circuit 220 is shown in FIG. 2. Furthermore, example circuit diagrams of combined quadrature circuits 220 are shown in FIGS. 3A and 3B.

The quadrature circuit 220 comprises a I-channel circuit 221 and a corresponding Q-channel circuit 222, which may be linked via a cross-coupling circuit 214. The I-channel circuit 221 and the Q-channel circuit 222 each comprise a mixer 111 for down-conversion of the RF signal 133 into the IF domain. Furthermore, the I-channel circuit 221 and the Q-channel circuit 222 each comprise an oscillator 212 with an oscillation frequency that corresponds to the intermediate frequency, thereby providing an efficient filtering and amplification of the respective IF signal 134. The oscillators 212 may comprise an RC filter 213.

The quadrature circuit 220 provides filtered and/or amplified IF signals 235 (for the I-channel and for the Q-channel), which may be provided to the respective AD converters 114 to provide the respective BB (baseband) signals 135. The BB signals 135 may be processed in an adaptive gain control (AGC) unit 240 configured to adjust a gain of the RF amplifier 103 and/or of the quadrature circuit 220.

Hence, FIG. 2 shows a low-IF receiver 100 which comprises a single-stage combined quadrature (in I and Q paths) RF-IF-BB circuit 220 between the RF amplifier 103 and the ADC 114. In particular, FIG. 2 shows a differential version of the low-IF receiver 100. A relatively weak RF signal 132 (received at the antenna 101) is amplified by the RF amplifier 103 and is fed to the RF-IF-BB circuit 220. In the RF-IF-BB circuit 220, the RF signal 133 is down-converted to IF signals 134 by the quadrature LO signals 136 (0° and 90° phase, respectively). The IF signals 134 on the I and Q paths are filtered out and amplified sufficiently before being fed to the respective ADC 114. The frequency conversion (RF-to-IF), the filtering to the desired IF and the BB amplification are performed by a single-stage combined-quadrature circuit 220 instead of using multi-stage cascaded separate quadrature (separate circuits for I and Q paths) down-conversion mixers 111, LPFs (low pass filters) 112 and VGAs or PGAs (variable or programmable amplifiers) 113.

FIGS. 3A and 3B show example circuit diagrams of the RF-IF-BB circuit 220. The circuit 220 comprises an in-phase (I) section 221 and a quadrature (Q) section 222, which may be connected with one another via a switching network 214 (i.e., via a cross-coupling circuit). Each sub-circuit 221, 222 (I or Q) comprises a switching mixer 111, a cross-coupled transistor pair (M1 and M2 or M3 and M4, respectively) and respective RC filters 213 as a load. A switchable network 214 may be used between the IF signals 134 and the BB output signals 235 of I and Q sub-circuits 221, 222. In particular, the IF signal 134 of I sub-circuit 221 may be coupled with the BB signal 235 of the Q sub-circuit 222. Furthermore, the IF signal 134 of Q sub-circuit 222 may be coupled with the BB signal 235 of the I sub-circuit 221.

The incoming RF signal 133 switched by quadrature LO signals 136, 336 (LO0°, LO180° for the I sub-circuit 221, and LO90° and LO270° for the Q sub-circuit 222) is down-converted to respective quadrature IF (RF-LO) signals 134 (IFI+, IFI– and IFQ+, IFQ–, respectively). The capacitor C0 (or C1) filters out high frequency RF signals and/or the LO signals 136, 336.

The positive feedback which is provided by the cross-coupled transistor pair (M1 and M2 or M3 and M4, respectively) causes the oscillation at IF frequency and generates amplified quadrature BB signals 235 (BBI+, BBI– and BBQ+, BBQ–, respectively). The RC network 213 filters out the out-off band signals in the respective sub-circuit 221, 222, wherein the RC network 213 is tuned to the IF frequency. The programmability of the load capacitor in the RC network 213 allows for tuning over a relatively wide range of IF frequencies. Overall, the IF-BB section 212, 213 corresponds to an active RC band-pass filter (BPF) based oscillator and remains locked into the IF frequency. The RC BPF achieves $2^{nd}$-order characteristics in oscillating mode. The overall $3^{rd}$-order filtering effect is achieved in attenuating the out-off-band signals.

It can be shown that in the RF-IF-BB circuit 220, the RC load 213 introduces a further pole, thereby achieving a $3^{rd}$-order filtering. The slope of the $3^{rd}$-order band-pass filter is +30 dB/decade. The single-stage IF-BB circuit 220 is configured to attenuate out-of-band components and/or interference significantly.

FIG. 3B shows a transistor-level implementation of an RF-IF-BB circuit 220. The RF signal 133 coming from the RF amplifier 103 is switched by LO signals 136, 336, and is commuted to the IF ports (IF+, IF– for the I sub-circuit 221 and for the Q sub-circuit 222, respectively) through a variable or programmable resistor 321. By varying the resistance value of the resistor 321, the IF current 134 through the cross-coupled pair (M1/M2 or M3/M4, respectively) of the IF-BB section 212 of the respective sub-circuit 221, 222 may be controlled. An additional gain-control may be achieved by controlling the current sources (I0, I1, I2, I3) of the respective sub-circuit 221, 222. As a result, a 30-36 dB gain control may be achieved.

In the single-stage RF-IF-BB circuit 220, an adaptive gain-control technique may be used to avoid the saturation of its BB outputs 235 (clipped BB outputs), in case of a relatively large RF input power. This gain-control may be part of an AGC system 240 of the RF receiver 100 (e.g., with a 60-66 dB gain adjustment). The gain control may be applied to the RF amplifier 103 and/or to the IF-BB gain of circuit 220, thereby enabling the use of an efficient AGC algorithm.

For the image rejection, the cross-coupled connection IF inputs 134 (IFI+, IFI– and IFQ+, IFQ–, respectively) to the BB outputs 235 (BBI+, BBI– and BBQ+, BBQ–, respectively), via switching elements 310, 311, may be provided using a polarity switching network 214. The cross-coupled connections may be provided between two integrators of an RC quadrature oscillator. The polarity switch 214 may be a multiplexer, where the connections of the switches (S1 & S2 and S3 & S4) are inter-changed between nodes (A & B or C & D).

Figure 4:
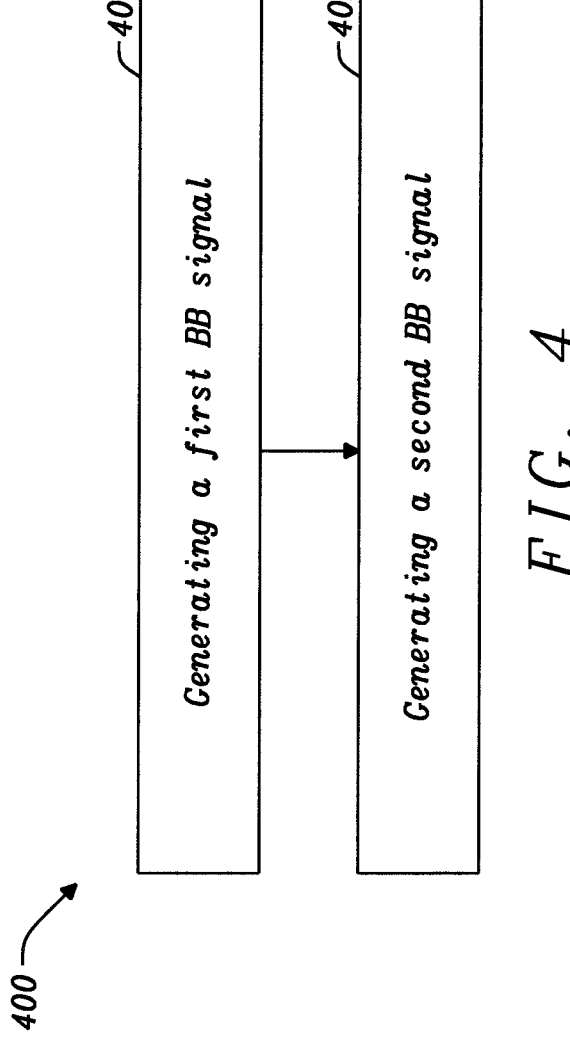
FIG. 4 shows a flow chart of an example method for receiving a radio frequency signal.

FIG. 4 shows a flow chart of an example method 400 for processing a radio frequency (RF) signal 133 (e.g., within an RF receiver 100). The method 400 comprises generating 401 a first baseband (BB) signal 235 (notably an I-channel BB signal) at an IF frequency, from the RF signal 133 using a local oscillator (LO) signal 136 at a first phase and using a first oscillator 212 which is preferably locked to the IF frequency. The IF frequency may be relatively close to 0 Hz, e.g., shifted by one or two channels away from 0 Hz.

Furthermore, the method 400 comprises generating 402 a second BB signal 235 (notably a Q-channel BB signal) at the IF frequency from the RF signal 133 using the LO signal 136 at a second phase and using a second oscillator 212 which is preferably locked to the IF frequency. By making use of oscillators 212, amplified and/or filtered BB signals 235 may be provided in an efficient and precise manner.

Hence, a quadrature circuit 220 for a radio frequency (RF) receiver 100 is described. The quadrature circuit 220 comprises a first sub-circuit 221 configured to generate a first baseband (BB) signal 235 at an IF frequency, from a radio frequency (RF) signal 133 using a local oscillator (LO) signal 136 at a first phase. The LO frequency of the LO signal 136 may be relatively close to the RF frequency of the RF signal 133. In particular, the difference between the LO frequency and the RF frequency may be 10% or less or 5% or less or 1% or less of the RF frequency. The difference between the LO frequency and the RF frequency may be equal to the IF frequency. The RF signal 133 may have been derived from a radio signal 131 using an antenna 101. The first sub-circuit 221 may be an I-channel sub-circuit. The first BB signal 235 may be a differential signal.

Furthermore, the quadrature circuit 220 comprises a second sub-circuit 222 (e.g., a Q-channel sub-circuit) configured to generate a second BB signal 235 at the IF frequency from the RF signal 133 using the LO signal 136 at a second phase (wherein the phase difference between the first and the second phase may be) 90°. The second BB signal 235 may be a differential signal.

The first and second sub-circuit 221, 222 may each comprise an oscillator 212 which is locked to the IF frequency. As a result of this, an efficient and precise generation of the BB signals 235 may be achieved.

The first and/or the second sub-circuit 221, 222 may each comprise a filter unit 213 which is configured to attenuate signals at frequencies which are greater and/or smaller than the IF frequency. The filter unit 213 may comprise one or more (tunable) RC networks. Alternatively, or in addition, the filter unit 213 may exhibit a tunable cut-off frequency, in particular using a tunable capacitor. As a result of this, the oscillators 212 may be locked to the IF frequency in a precise and flexible manner.

The oscillator 212 of the first and/or second sub-circuit 221, 222 may each comprise a cross-coupled transistor pair M1, M2; M3, M4, respectively. The transistor pair may exhibit a positive feedback. The filter unit 213 may be arranged as a load of the cross-coupled transistor pair M1, M2; M3, M4. As a result, oscillation may be achieved in an efficient and reliable manner.

The first sub-circuit 221 may comprise a first mixer 111, in particular a first switching mixer, configured to mix the RF signal 133 with the LO signal 136 at the first phase, to generate a first IF signal 134. The (first) oscillator 212 of the first sub-circuit 221 may be configured to filter and/or to amplify the first IF signal 134 to generate the first BB signal 235. In a similar manner, the second sub-circuit 222 may comprise a second mixer 111, in particular a second switching mixer, configured to mix the RF signal 133 with the LO signal 136 at the second phase, to generate a second IF signal 134. The (second) oscillator 212 of the second sub-circuit 222 may be configured to filter and/or to amplify the second IF signal 134 to generate the second BB signal 235. By doing this, the BB signals 235 may be provided in a particularly efficient and precise manner.

The quadrature circuit 220 may comprise a cross-coupling circuit 214 which is configured to couple the first IF signal 134 with the second BB signal 235, and/or to couple the second IF signal 134 with the first BB signal 235. The cross-coupling circuit 214 may comprise a polarity switch configured to switch the polarity of the first IF signal 134 prior to coupling the first IF signal 134 with the second BB signal 235. Alternatively, or in addition, the cross-coupling circuit 214 may comprise a polarity switch configured to switch the polarity of the second IF signal 134 prior to coupling the second IF signal 134 with the first BB signal 235. By making use of a cross-coupling circuit 214, image rejection of the quadrature circuit 220 may be improved.

The quadrature circuit 220 may comprise an adaptive gain control unit 240 which is configured to adapt the gain of the first and/or second sub-circuit 221, 222, in particular of the oscillator 212 of the first and/or second sub-circuit 221, 222, in dependence of the signal level of the first and/or second BB signals 235. By making use of adaptive gain control, the flexibility and the quality of the RF receiver 100 may be improved.

The quadrature circuit 220 may comprise a first analog-to-digital converter 114 configured to convert the first (differential) BB signal 235 into a first (differential) digital BB signal 135. Furthermore, the quadrature circuit 220 may comprise a second analog-to-digital converter 114 configured to convert the second (differential) BB signal 235 into a second (differential) digital BB signal 135. As a result of this, a precise processing of the BB signals 135, 235 may be enabled (e.g., for adaptive gain control).

In the following, when referring to "a sub-circuit 211, 222", this may apply to the first sub-circuit 211 and/or to the second sub-circuit 222. The transistors may be field effect transistors (FET), in particular MOSFETs.

A sub-circuit 221, 222, in particular an oscillator 212, of the quadrature circuit 220 may comprise a first transistor M1, M3 arranged between a supply voltage and a reference voltage (e.g., ground), and a second transistor M2, M4 arranged between the supply voltage and the reference voltage. The first and the second transistor may form a cross-coupled transistor pair.

The drain of the first transistor M1; M3 may be coupled (directly or via a filter unit 213) with the supply voltage. The source of the first transistor M1; M3 may be coupled (directly or via a current source) with the reference voltage. In a similar manner, the drain of the second transistor M2; M4 may be coupled (directly or via a filter unit 213) with the supply voltage and the source of the second transistor M2; M4 may be coupled (directly or via a current source) with the reference voltage.

The gate of the first transistor M1; M3 may be coupled, in particular may be directly coupled, with the drain of the second transistor M2; M4. The gate of the second transistor M2; M4 may be coupled, in particular may be directly coupled, with the drain of the first transistor M1; M3. As a result of this, an oscillator 212 may be provided in an efficient and reliable manner.

A first differential IF signal IFI+; IFQ+, which is derived from the RF signal 134, may be applied, in particular directly applied, to the source of the first transistor M1; M3. Furthermore, a second differential IF signal IFI−; IFQ−, which is derived from the RF signal 134, may be applied, in particular directly applied, to the source of the second transistor M2; M4.

The sub-circuit 221, 222 of the quadrature circuit 220 may comprise a first switching element (e.g., a transistor) (as part of a mixer 111) configured to couple or to decouple the RF signal 133 to or from the drain of the first transistor M1; M3 in dependence of the LO signal at the first phase (in case of the first sub-circuit 221) or at the second phase (in case of the second sub-circuit 222), in order to provide the first differential IF signal IFI+; IFQ+ (directly or via a variable resistance) at the source of the first transistor M1; M3. Furthermore, the sub-circuit 221, 222 of the quadrature circuit 220 may comprise a second switching element (e.g., a transistor) (as part of the mixer 111) configured to couple or to decouple the RF signal 133 to or from the drain of the second transistor M2; M4 in dependence of the LO signal at the first phase (in case of the first sub-circuit 221) or at the second phase (in case of the second sub-circuit 222), phase shifted by 90°, in order to provide the second differential IF signal IFI−; IFQ− (directly or via a variable resistance) at the source of the second transistor M2; M4. As a result of this, the IF signals 134 may be provided in an efficient and reliable manner.

The sub-circuit 221, 222 of the quadrature circuit 220 may comprise a first variable resistance arranged between the first switching element and the drain of the first transistor M1; M3. Furthermore, the sub-circuit 221, 222 of the quadrature circuit 220 may comprise a second variable resistance arranged between the second switching element and the drain of the second transistor M2; M4. The first and/or second variable resistance may be used for providing adaptive gain control in an efficient and precise manner. In particular, the adaptive gain control unit 240 may be configured to adapt the first variable resistance and/or the second variable resistance in dependence of the signal level of the first and/or second BB signals 235.

A first differential BB signal BBI+; BBQ+ may be provided at the drain of the first transistor M1; M3. On the other hand, a second differential BB signal BBI−; BBQ− may be provided at the drain of the second transistor M2; M4. By making use of differential signals, the precision of the RF receiver 100 may be increased.

As indicated above, the quadrature circuit 220 may comprise a cross-coupling circuit 214. The cross-coupling circuit 214 may be configured to couple the source of the first transistor M1 of the first sub-circuit 221 with the drain of the first transistor M3 or with the drain of the second transistor M4 of the second sub-circuit 222 (in case of polarity switching) via a switching element (e.g., a transistor) which is controlled in dependence of the first differential BB signal BBI+ of the first sub-circuit 221.

Alternatively, or in addition, the cross-coupling circuit 214 may be configured to couple the source of the second transistor M2 of the first sub-circuit 221 with the drain of the second transistor M4 or with the drain of the first transistor M3 of the second sub-circuit 222 (in case of polarity switching) via a switching element (e.g., a transistor) controlled in dependence of the second differential BB signal BBI− of the first sub-circuit 221.

Alternatively, or in addition, the cross-coupling circuit 214 may be configured to couple the source of the first transistor M3 of the second sub-circuit 222 with the drain of the first transistor M1 or with the drain of the second transistor M2 of the first sub-circuit 221 (in case of polarity switching) via a switching element (e.g., a transistor) controlled in dependence of the first differential BB signal BBI+ of the second sub-circuit 222.

Alternatively, or in addition, the cross-coupling circuit 214 may be configured to couple the source of the second transistor M4 of the second sub-circuit 222 with the drain of the second transistor M2 or with the drain of the first transistor M1 of the first sub-circuit 221 (in case of polarity switching) via a switching element (e.g., a transistor) controlled in dependence of the second differential BB signal BBI− of the second sub-circuit 222. By making use of a cross-coupling unit 214, image rejection may be improved.

The sub-circuit 221, 222, in particular the oscillator 212, of the quadrature circuit 220 may comprise a first RC circuit 213 arranged between the drain of the first transistor M1; M3 and the supply voltage, and/or a second RC circuit 213 arranged between the drain of the second transistor M2; M4 and the supply voltage, thereby providing an efficient and precise lock-in to the IF frequency.

The sub-circuit 221, 222, in particular the oscillator 212, of the quadrature circuit 220 may comprise a first (adjustable) current source 10; 12 arranged between the source of the first transistor M1; M3 and the reference voltage, and/or a second (adjustable) current source I1; I3 arranged between the source of the second transistor M2; M4 and the reference voltage. The current sources may be controlled by the adaptive gain control unit 240 for further improving AGC.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A quadrature circuit for a radio frequency receiver, wherein the quadrature circuit comprises,
   a first sub-circuit configured to generate a first baseband, BB, signal at an intermediate frequency, IF frequency, from a radio frequency, RF, signal using a local oscillator, LO, signal at a first phase; and
   a second sub-circuit configured to generate a second BB signal at the IF frequency from the RF signal using the LO signal at a second phase; wherein the first and second sub-circuit each comprise an oscillator which is locked to the IF frequency; wherein
   the first and/or the second sub-circuit of the quadrature circuit each comprise a first transistor arranged between a supply voltage and a reference voltage and a second transistor arranged between the supply voltage and the reference voltage;
   a drain of the first transistor is coupled with the supply voltage and a source of the first transistor is coupled with the reference voltage;
   a drain of the second transistor is coupled with the supply voltage and a source of the second transistor is coupled with the reference voltage;
   a gate of the first transistor is coupled with the drain of the second transistor; and
   a gate of the second transistor is coupled with the drain of the first transistor.

2. The quadrature circuit according to claim 1, wherein the first and/or second sub-circuit comprise a filter unit configured to attenuate signals at frequencies which are greater and/or smaller than the IF frequency.

3. The quadrature circuit according to claim 2, wherein the filter unit comprises one or more RC networks.

4. The quadrature circuit according to claim 2, wherein the filter unit exhibits a tunable cut-off frequency, in particular using a tunable capacitor.

5. The quadrature circuit according to claim 1, wherein the oscillator of the first and/or second sub-circuit comprises a cross-coupled transistor pair.

6. The quadrature circuit according to claim 5, wherein the filter unit is arranged as a load of the cross-coupled transistor pair, and wherein the first and/or second sub-circuit comprise a filter unit configured to attenuate signals at frequencies which are greater and/or smaller than the IF frequency.

7. The quadrature circuit according to claim 1, wherein the first sub-circuit comprises a first mixer configured to mix the RF signal with the LO signal at the first phase, to generate a first IF signal; wherein the oscillator of the first sub-circuit is configured to filter and/or to amplify the first IF signal to generate the first BB signal; and the second sub-circuit comprises a second mixer configured to mix the RF signal with the LO signal at the second phase, to generate a second IF signal; wherein the oscillator of the second sub-circuit is configured to filter and/or to amplify the second IF signal to generate the second BB signal.

8. The quadrature circuit according to claim 7, wherein the quadrature circuit comprises a cross-coupling circuit configured to couple the first IF signal with the second BB signal; and/or couple the second IF signal with the first BB signal.

9. The quadrature circuit according to claim 8, wherein the cross-coupling circuit comprises a polarity switch configured to switch a polarity of the first IF signal prior to coupling the first IF signal with the second BB signal; and/or a polarity switch configured to switch a polarity of the second IF signal prior to coupling the second IF signal with the first BB signal.

10. The quadrature circuit according to claim 1, wherein the quadrature circuit comprises an adaptive gain control unit configured to adapt a gain of the first and/or second sub-circuit in dependence of a signal level of the first and/or second BB signals.

11. The quadrature circuit according to claim 1, wherein the oscillator of the first and/or second sub-circuit of the quadrature circuit comprises the first transistor arranged between the supply voltage and the reference voltage, and the second transistor arranged between supply voltage and the reference voltage.

12. The quadrature circuit according to claim 1, wherein a first differential IF signal, which is derived from the RF signal, is applied to the source of the first transistor; and a second differential IF signal, which is derived from the RF signal, is applied to the source of the second transistor.

13. The quadrature circuit according to claim 12, wherein the first and/or the second sub-circuit of the quadrature circuit each comprise a first switching element configured to couple or to decouple the RF signal to or from the drain of the first transistor in dependence of the LO signal at the first phase or at the second phase, in order to provide the first differential IF signal at the source of the first transistor; and a second switching element configured to couple or to decouple the RF signal to or from the drain of the second transistor in dependence of the LO signal at the first phase or at the second phase, phase shifted by 90°, in order to provide the second differential IF signal at the source of the second transistor.

14. The quadrature circuit according to claim 13, wherein the first and/or the second sub-circuit of the quadrature circuit each comprise a first variable resistance arranged between the first switching element and the drain of the first transistor;

the first and/or the second sub-circuit of the quadrature circuit each comprise a second variable resistance arranged between the second switching element and the drain of the second transistor; and the quadrature circuit comprises an adaptive gain control unit configured to adapt the first variable resistance and/or the second variable resistance in dependence of a signal level of the first and/or second BB signals.

15. The quadrature circuit according to claim 1, wherein a first differential BB signal is provided at the drain of the first transistor; and a second differential BB signal is provided at the drain of the second transistor.

16. The quadrature circuit according to claim 15, wherein the quadrature circuit comprises a cross-coupling circuit configured to couple the source of the first transistor of the first sub-circuit with the drain of the first transistor or with the drain of the second transistor of the second sub-circuit via a switching element controlled in dependence of the first differential BB signal of the first sub-circuit;

couple the source of the second transistor of the first sub-circuit with the drain of the second transistor or with the drain of the first transistor of the second sub-circuit via a switching element controlled in dependence of the second differential BB signal of the first sub-circuit;

couple the source of the first transistor of the second sub-circuit with the drain of the first transistor or with the drain of the second transistor of the first sub-circuit via a switching element controlled in dependence of the first differential BB signal of the second sub-circuit; and couple the source of the second transistor of the second sub-circuit with the drain of the second transistor or with the drain of the first transistor of the first sub-circuit via a switching element controlled in dependence of the second differential BB signal of the second sub-circuit.

17. The quadrature circuit according to claim 1, wherein the first and/or the second sub-circuit of the quadrature circuit each comprise a first RC circuit arranged between the drain of the first transistor and the supply voltage; and a second RC circuit arranged between the drain of the second transistor and the supply voltage.

18. The quadrature circuit according to claim 1, wherein the first and/or the second sub-circuit of the quadrature circuit each comprise a first current source arranged between the source of the first transistor and the reference voltage; and a second current source arranged between the source of the second transistor and the reference voltage.

19. The quadrature circuit according to claim 1, wherein the quadrature circuit comprises, a first analog-to-digital converter configured to convert the first BB signal into a first digital BB signal; and a second analog-to-digital converter configured to convert the second BB signal into a second digital BB signal.

20. A method for processing a radio frequency signal; wherein the method comprises, generating a first baseband, BB, signal at an intermediate frequency, IF frequency, from a radio frequency, RF, signal using a local oscillator, LO, signal at a first phase and using a first oscillator which is locked to the IF frequency; and generating a second BB signal at the IF frequency from the RF signal using the LO signal at a second phase and using a second oscillator which is locked to the IF frequency; wherein the first and/or the second oscillator each comprise a first transistor arranged between a supply voltage and a reference voltage, and a second transistor arranged between the supply voltage and the reference voltage;

a drain of the first transistor is coupled with the supply voltage and a source of the first transistor is coupled with the reference voltage;

a drain of the second transistor is coupled with the supply voltage and a source of the second transistor is coupled with the reference voltage;

a gate of the first transistor is coupled with the drain of the second transistor; and a gate of the second transistor is coupled with the drain of the first transistor.

\* \* \* \* \*